{| |}
United States Patent
Jost et al.

(10) Patent No.: US 7,953,419 B2
(45) Date of Patent: May 31, 2011

(54) METHOD FOR INTEGRATION OF NETWORK NODES

(75) Inventors: Fritz Jost, Mettmenstetten (CH); Daniel Kottmann, Steinhausen (CH); Otto Leuthold, Sins (CH)

(73) Assignee: Siemens AG, Munich (DE)

( * ) Notice: Subject to any disclaimer, the term of this patent is extended or adjusted under 35 U.S.C. 154(b) by 659 days.

(21) Appl. No.: 12/028,476

(22) Filed: Feb. 8, 2008

(65) Prior Publication Data

US 2008/0205427 A1    Aug. 28, 2008

(30) Foreign Application Priority Data

Feb. 9, 2007 (EP) .................................. 07102082

(51) Int. Cl.
*H04Q 7/20* (2006.01)
(52) U.S. Cl. ..................................... 455/456.1; 455/446
(58) Field of Classification Search ............... 455/456.1, 455/446
See application file for complete search history.

(56) References Cited

U.S. PATENT DOCUMENTS 6,336,035 B1 * 1/2002 Somoza et al. ............... 455/446
2004/0110515 A1 * 6/2004 Blumberg et al. .......... 455/456.1

FOREIGN PATENT DOCUMENTS

| EP | 1 107 512 A1 | 6/2001 |
| EP | 1 211 582 B1 | 5/2003 |
| EP | 1 263 167 B1 | 2/2005 |
| WO | 03/061176 A2 | 7/2003 |
| WO | 03/081373 A2 | 10/2003 |
| WO | 03/098815 A2 | 11/2003 |

* cited by examiner

*Primary Examiner* — Charles Shedrick
(74) *Attorney, Agent, or Firm* — Staas & Halsey LLP

(57) ABSTRACT

In a data communications network building automation system, integration of wirelessly communicating network nodes is visualized in a process environment on an output unit of a commissioning device. The current spatial position of the commissioning device is detected and represented in the visualized process environment by detecting an identification signal of the network nodes and determining a relative spatial position of the network nodes for which the identification signal was detected. A proposal for the assignment of the detected identification signal to a node model is stored in a database based on the relative spatial position, in relation to the spatial position of the commissioning device.

7 Claims, 3 Drawing Sheets

METHOD FOR INTEGRATION OF NETWORK NODES

CROSS REFERENCE TO RELATED APPLICATIONS

This application is based on and hereby claims priority to European Application No. EP 07102082 filed on Feb. 9, 2007, the contents of which are hereby incorporated by reference.

BACKGROUND

A method suitable, for example, for commissioning networks with distributed closed-loop and open-loop control applications in a building will be described. This type of method makes possible a simplified integration of wirelessly-communicating network nodes in a communication network of a building automation system. A wirelessly-communicating network node here is typically a field device, i.e., a device with a sensor and/or actuator function.

A building automation system is an arrangement for monitoring, open-loop and/or closed-loop control of process variables in complex technical systems in a building, or in an area with a number of buildings. A building automation system typically operates heating, ventilation and air conditioning systems, illumination and shading systems as well as access control, security and fire monitoring systems. In the building automation system process variables—such as air conditioning variables or events—are detected, evaluated, monitored, influenced or generated.

In a building automation system there is as a rule a plurality of so-called field devices, such as sensors and actuators, to be operated. Typical field devices of a building automation system are for example temperature and humidity sensors, air quality sensors, pressure sensors, throughflow meters, electricity meters, heat meters, hot water valves, thermostat valves, ventilation flaps, sprinkler valves, brightness sensors, fire alarms, intruder alarms, light switches, smart card readers and readers for detecting biometric data.

As well as the field devices a building automation system as a rule includes a plurality of open-loop and closed-loop control devices as well as further devices, for example devices for connection of the building automation system to external communication networks, screens or devices for analysis of video signals.

Furthermore an electrical or wireless communications medium will be used in a building automation system for the exchange of data between individual terminals or parts of the system, basically cables, optical data communication channels, ultrasound links, electromagnetic near fields of radio networks or combinations thereof can be used, for example a glass fiber network or a cellular telephone network as well. Technologies or standards able to be used for the data exchange are for example BACNet, LON or LonWorks® from ECHELON, the European Installation Bus EIB, KONNEX, ZigBee or PROFIBUS defined in accordance with the German standard DIN 19245.

When networks with distributed closed-loop or open-loop control applications are commissioned a functional assignment of a plurality of network nodes is undertaken, which means that field devices are assigned to responsible closed-loop or open-loop control devices. After the functional assignment all field devices and the function assigned to them which form a closed-loop control circuit with the closed-loop and open-loop control devices assigned to them are known. Advantageously current spatial co-ordinates and a communication address are stored after commissioning for each field device current in the building control system.

A method for commissioning field devices of a building automation system is for example also known from EP 1 211 582 A.

Known methods for integrating wirelessly-communicating network nodes into a communications network of a building automation system have the disadvantage of being labor-intensive and thereby also time-consuming. In addition known methods require special characteristics in the field devices to be integrated, such as for example a pushbutton switch on the field device which, when manually actuated on the field device, triggers certain functions, for example the sending out of a telegram featuring an identification and/or of an optical or acoustic signal.

A further disadvantage of known commissioning methods lies in the fact that incorrectly integrated field devices can as a rule only be perceived indirectly by a malfunction in the building automation system.

SUMMARY

An aspect is to specify an improved and generally applicable method and devices for integrating wirelessly-communicating network nodes into a communications network of a building automation system.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
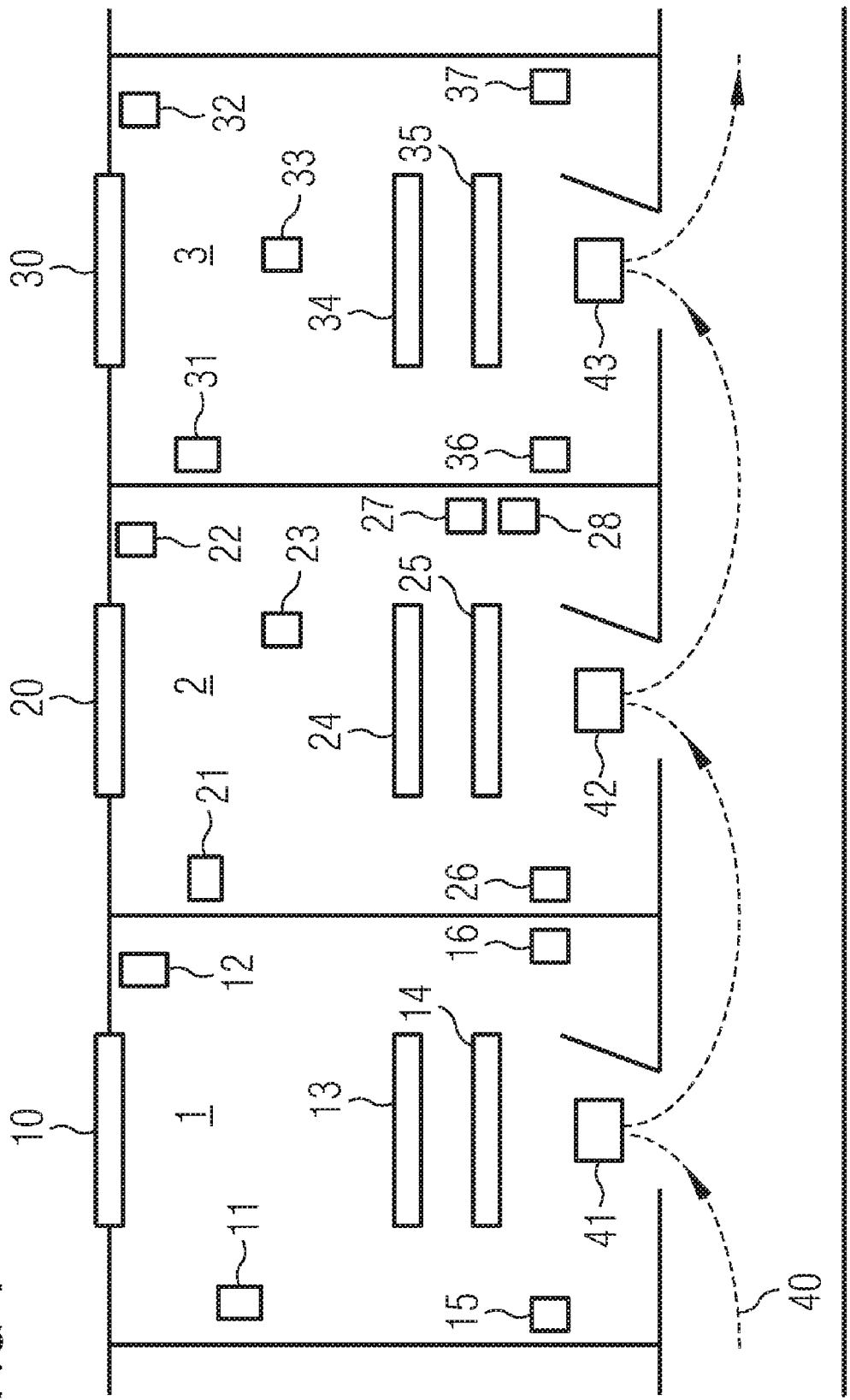
FIG. 1 is a plan view of rooms of a building with devices of a building automation system enabled for wireless communication.

Reference will now be made in detail to the preferred embodiments, examples of which are illustrated in the accompanying drawings, wherein like reference numerals refer to like elements throughout.

The method described below for integrating wirelessly-communicating network nodes is executed by a commissioning facility. The commissioning facility is a so-called engineering tool, to which the wirelessly-communicating network nodes or field devices report their identification and advantageously also their functional characteristics. The functional characteristics of a device will for example be communicated with a certain function type from a predefined set of possible function types, with where necessary additional parameters, such as ranges of values or orders of magnitude, being added. The spatial co-ordinates of the current position of the commissioning facility are detected by the commissioning facility, advantageously by autonomous measurement, for example by an available GPS (Global Positioning System), or through manual input. The removal of a network node is determined for example by measuring a received signal strength and/or a signal delay time.

Basically an electronically stored image of the process environment exists in which field devices provided are stored in the form of node models. A node model is typically an instance of a node type which includes the necessary characteristics, i.e. the functionality of the network node or of the field device respectively.

The image of the process environment is available for the commissioning facility. The image of the process environment includes the functional assignment and required configuration of all network nodes such that all control loops provided are embodied with the correct functions. The node model can also be referred to as a virtual network node to which a real existing field device in a building room is assigned when integrated.

Advantageously not only the geometry of the building rooms but also, for all field devices arranged in a building room, at least an approximate spatial position in each case is known to the commissioning facility.

The commissioning facility features a graphical output unit on which at least a part of the process environment is able to be displayed. Advantageously the current position of the commissioning facility relative to the layout of the current building floor is able to be displayed on the graphical output unit.

The method for integration of network nodes of a process environment into a data communication network by a commissioning facility advantageously includes at least the following:

1: Visualization of at least a part of the process environment on an output device of the commissioning facility;
2: Detection of the current spatial position of the commissioning facility;
3: Showing the commissioning facility in accordance with its current position in the visualized part of the process environment;
4: Detection of an identification signal of the network node belonging to the process environment;
5: Generation of a proposal for the assignment of the detected identification signal to a node model stored in a database based on the relative spatial position determined, in relation to the spatial position of the commissioning device;
6: Showing the node model proposed for assignment in the visualized process environment;
7: The assignment of the network node to the proposed node model by storing address information present in the identification signal of the network node in a variable of the node model proposed for assignment; and
8: Showing the assigned network node in the visualized process environment.

Advantageously operations 4, 5, 6, 7 and 8 are repeated for each wirelessly-communicating device in a room; In addition operations 2 through 8 are to be repeated for each room of a building or of an area. Room here generally means a room in a building delimited by walls, for example an office, in which each wirelessly-communicating device of the room can be wirelessly addressed by the commissioning facility.

The part of a building floor shown in FIG. 1 features a first room 1, a second room 2 and a third room 3. Arranged in the first room 1 are a first device 10, a second device 11, a third device 12, a fourth device 13, a fifth device 14, a sixth device 15 and a seventh device 16. The second room 2 features an eighth device 20, a ninth device 21, a tenth device 22, an eleventh device 23, a twelfth device 24, a thirteenth device 25, a fourteenth device 26, a fifteenth device 27 and a sixteenth device 28. Finally arranged in the third room 3 are a seventeenth device 30, an eighteenth device 31, a nineteenth device 32, a twentieth device 33, a twenty first device 34, a twenty second device 35, a twenty third device 36, and a twenty fourth device 37.

The devices 10 through 37 shown in FIG. 1 are either field devices or open-loop and/or closed-loop control devices. The devices 10 through 37 are enabled for wireless communication, with wireless communication between devices 10 through 37 advantageously being undertaken in accordance with a standard. In the proposed method the devices 10 through 37 are integrated as network nodes into a building automation system.

In an advantageous variant of the building automation system open-loop and/or closed-loop devices with wireless communication capabilities are also connected by wires to a further communication network.

The number 40 indicates a typical path traveled by a person entrusted with system commissioning with a mobile commissioning facility while the proposed method for integrating network nodes is being executed. For integrating network nodes of the first room 1 the commissioning facility stays at a first position 41, for integrating network nodes of the second room 2 at a second position 42 and for integrating network nodes of the third room 3 at a third position 43.

Figure 2:
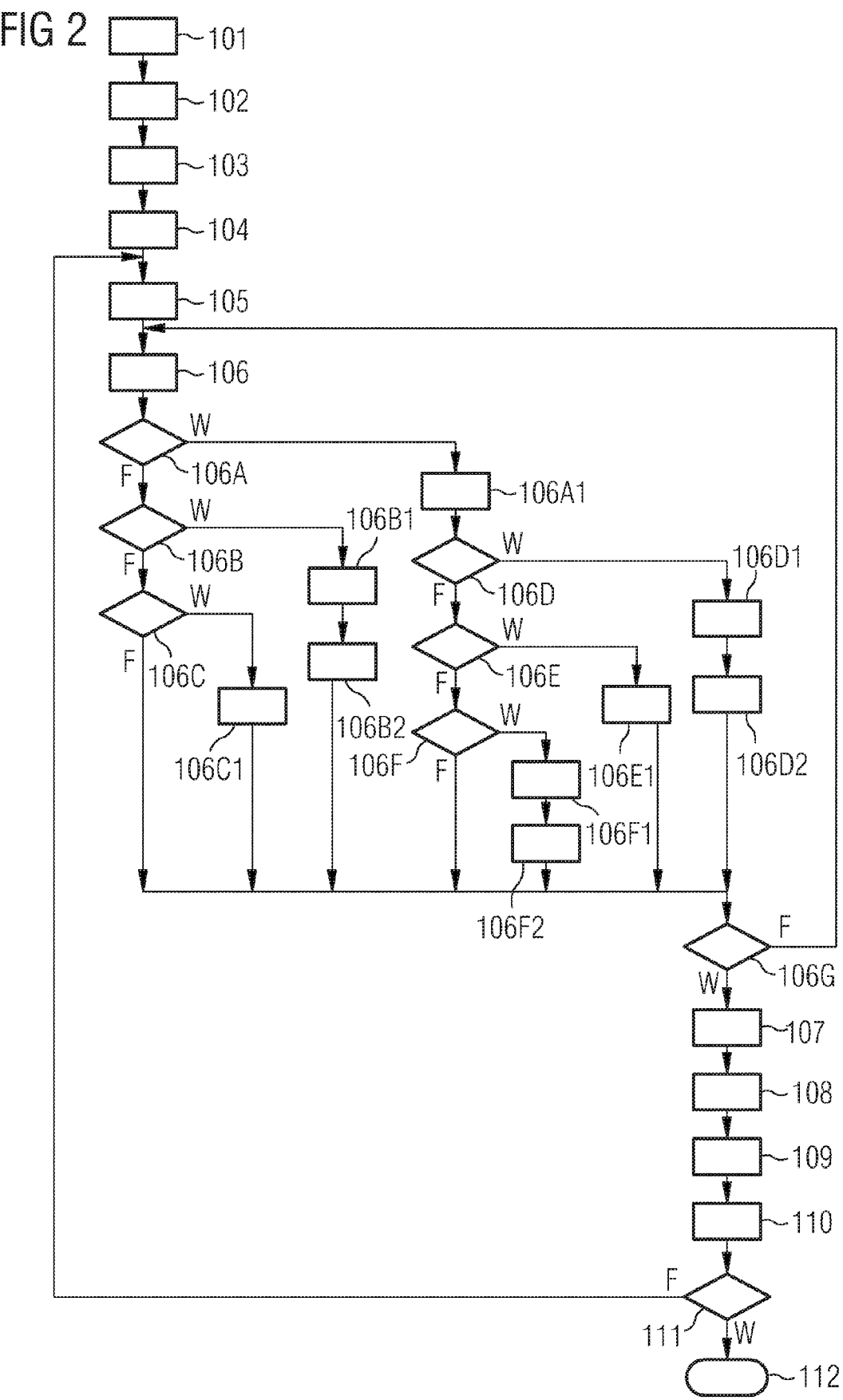
FIG. 2 is a flowchart of a method for integrating the devices into a communication network of the building automation system.

In FIG. 2 the number 101 identifies a first operation in the flowchart. The first operation 101 includes the selection of all devices 10 through 37 (FIG. 1) and their assignment to a room 1, 2 or 3 on the basis of applications provided within building automation. An application typically performs control of the air conditioning of a room or fire monitoring of a building zone or an access control. A second operation 102 includes the planning of the installation of all devices for each room 1, 2 and 3. After the second operation 102 at least the approximate spatial co-ordinates are known for each device at which it is to be monitored.

A third operation 103 includes the editing of the available information in the commissioning facility for each room 1, 2 and 3. The information advantageously includes the room geometry and also additional information about the installed devices. The additional information of a device advantageously includes a unique address, a device type, an assigned application, linkage information and especially with high device density an installation position as well, for example in the form of spatial co-ordinates. The linkage information advantageously specifies the further devices with which the device is to be linked. If the device is a temperature sensor for example, the linkage information typically specifies that a specific output of the device is to be linked to the input of a certain closed-loop control device.

In a fourth operation 104 the devices will be installed at the location provided in the building room. The first four operations 101 to 104 belong to the planning and installation phase and are an important prerequisite for the actual execution of the method for integration of wirelessly-communicating network nodes.

In a fifth operation 105 the current position 41, 42 or 43 (FIG. 1) of the commissioning facility is detected by the commissioning facility.

In a sixth operation 106 the devices of the current room 1, 2 or 3 are requested by the commissioning facility to notify it of their characteristic data. The characteristic data of a device is able to be detected by a receive device of the commissioning facility and advantageously includes a unique device number, a device type and an application provided for the device. Advantageously the devices of the current room not yet integrated are addressed by a so-called broadcast message.

In a first decision 106A the Boolean expression "precisely all devices of the current room have signed on" is evaluated for example. Provided the result is true, the process continues with a seventh operation 106A1, otherwise it continues with a second decision 106B.

In the seventh operation 106A1 the position of all devices which have signed on is determined in each case and is compared with the corresponding position known from the planning data. The result of this position comparison determines the further execution in accordance with a third decision 106D, a fourth decision 106E, a fifth decision 106F and a sixth decision 106G.

In the third decision 106D the Boolean expression "not all devices have the planned position" is evaluated for example. Provided the result is true, the process continues with an eighth operation 106D1 and a ninth operation 106D2, otherwise it continues with the fourth decision 106E.

In the sixth operation 8 a manual check of the position of the device in question or the devices in question by specialist personnel is required.

In the seventh operation 9 the position of devices involved is set correctly, by re-installation or by a manual correction via the user interface at the commissioning facility as required.

In the fourth decision 106E the Boolean expression "not all devices are within the current room" is evaluated for example. Provided the result is true, the process is continued with a tenth operation 106E1, otherwise it continues with the fifth decision 106F. The fourth decision 106E is true for example if the fourteenth device 26 arranged in the second room 2 (FIG. 1) signs on when the commissioning facility is in the first room 1 at the first position 41.

In the tenth operation 106E1 a manual check or correction is undertaken.

In the fifth decision 106F the Boolean expression "at least two devices have the same position" is evaluated for example. Provided the result is true the process continues with an eleventh operation 106F1 and a twelfth operation 106F2, otherwise it continues with the sixth decision 106G. The fifth decision value 106F is true for example if the fourth device 13 is installed close to a similar fifth device 14 in such a way that their positions detected by the commissioning facility cannot be uniquely distinguished by the commissioning facility.

In the eleventh operation 106F1 the devices involved are requested by the commissioning facility automatically and in succession to make themselves known optically or acoustically for example. To this end, a device is typically equipped with light-emitting diodes, which optically indicate the presence of the device after a corresponding request command.

In the twelfth operation 107F2 the devices involved are assigned the planned position.

In the second decision 106B the Boolean expression "more devices than are planned for the current room have signed on" is evaluated for example. Provided the result is true the process is continued with a thirteenth operation 106B1 and a fourteenth operation 106B2, otherwise it continues with a seventh decision 106C. The second decision 106B is true for example if it too many devices have actually been installed in the current room or if a device installed in an adjacent room signs on.

In the thirteenth operation 106B1 the positions of all signed-on devices are detected by the commissioning facility and compared with the corresponding planned positions. In the fourteenth operation 106B2 the installation is checked visually and if necessary corrected manually.

In the seventh decision 106C the Boolean expression "not all devices which are planned for the current room have signed on" is evaluated for example. Provided the result is true the process continues with a fifteenth operation 106C1, otherwise it continues with the sixth decision 106G. The seventh decision 106C is for example true if too few devices or defective devices are installed.

In the fifteenth operation 106C1 the installation is manually completed by a required device being installed afterwards for example.

In the sixth decision 106G the Boolean expression of "all devices are in the planned position" is evaluated for example. Provided the result is false, the process branches back in the execution sequence before the sixth operation 106 and repeats the process as from the sixth operation 106, otherwise the process is continued with a sixteenth operation 107, a seventeenth operation 108, an eighteenth operation 109, a nineteenth operation 110 and finally an eighth decision 111.

In the sixteenth operation 107 the corresponding position determined by the commissioning facility and a current room designation is transferred to all devices.

In the seventeenth operation 108 all linkage functions are executed. If the second device 11 is a room temperature sensor for example and the sixth device 15 is a closed-loop control device with temperature display, and if the two devices 11 and 15 are assigned a common application, an output of the second device 11 is linked to a corresponding input of the sixth device 15. And if for example the twelfth device 24 is a luminaire and the fifteenth device 27 is a light switch with which the luminaire 24 is to be switched, an output of the fifteenth device 27 is linked to an input of the twelfth device 24.

In the eighteenth operation 109 all integrated devices are notified by the commissioning facility that they are integrated as network nodes into the wireless communication network of the building automation system.

In the nineteenth operation 110 a check on the room function is advantageously executed. If for example, as mentioned by way of example in the seventeenth operation 108, the room temperature sensor 11 is linked to the closed-loop control device 15, in the corresponding check of the room function the current room temperature measured by the room temperature sensor 11 can be read out at the temperature display of the closed-loop control device 15. In accordance with the above linkage examples the effect of the switch 27 on the luminaire 24 is also checked in the check of the room function.

In the eighth decision value 111 the Boolean expression "the devices in all rooms are integrated" is evaluated for example. Provided the result is false a branch is made in the execution sequence back to before the fifth operation 105 and the process is repeated from the fifth operation 105 for a further room, otherwise an end 112 of the execution sequence is reached.

It goes without saying that the basic execution sequence shown in FIG. 2 can be represented by equivalent diagram variants in which for example the Boolean expressions formulated in conjunction with FIG. 2 are formulated at least partly inversely or in another sequence. These equivalent presentations would however in the final analysis lead to the same end result, namely to all devices being integrated.

As a rule wirelessly-communicating field devices have their own electrical energy supply, for example a battery arranged in the field device. So that frequent battery changes are not necessary, an energy-saving operating mode should be especially ensured with these types of field device. With the field devices which merely exercise a sensor function, the fact can now be utilized that the field device in normal operation only has to deliver measured values at certain time intervals, for example using its own radio transmitter, but a receiver function is not necessary in normal operation.

Figure 3:
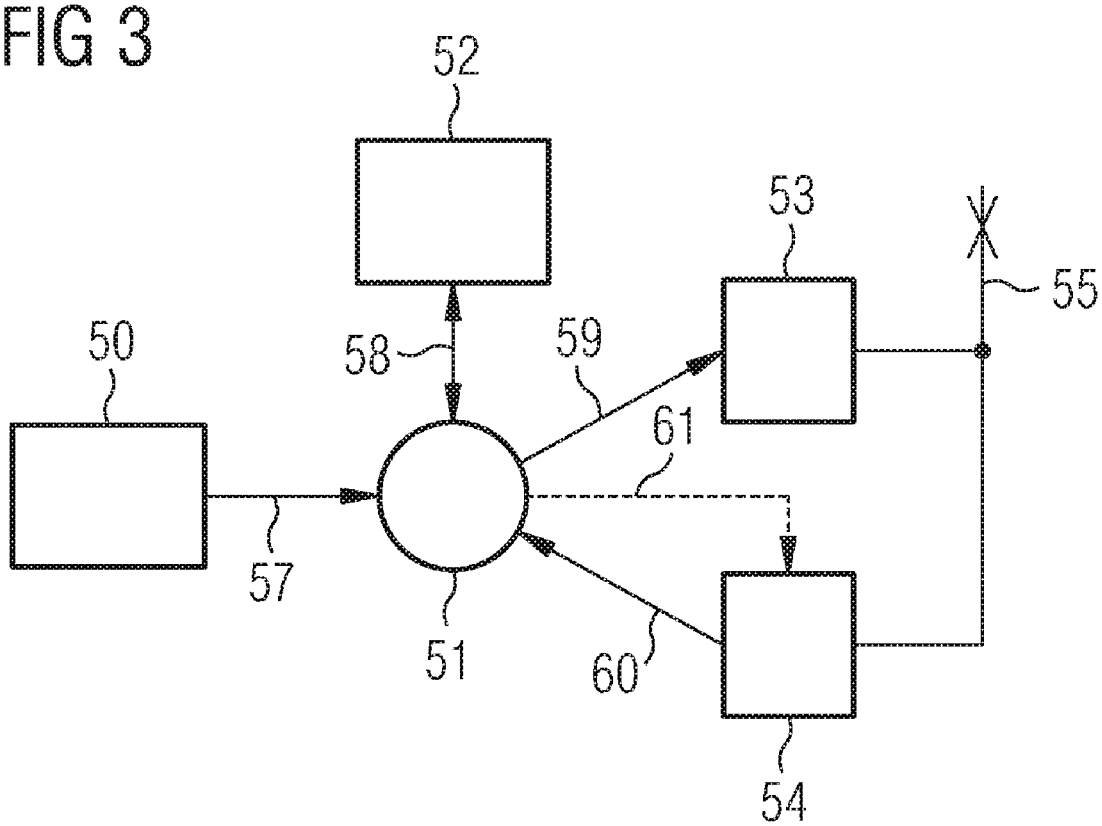
FIG. 3 is a block diagram of a field device with a sensor function.

As explained above, in the eighteenth operation 109, all integrated devices are notified by the commissioning facility that they are integrated as network nodes into the wireless communication network of the building automation system. For the integrated field device which has only to exercise one sensor function the result is that it has the energy-saving option that an existing radio receiver can actually be switched off after integration if the structure of the field device permits this. FIG. 3 shows the basic structure of a field device with sensor function. The advantageous structure of the field device makes it possible to switch off the radio receiver after the field device is integrated in the proposed method into the wireless communication network.

The advantageous field device with sensor function features a sensor 50, a programmed processor 51, an information store 52, a transmitter 53, a receiver 54 and an antenna 55. A sensor signal 57 detected by the sensor is for example periodically or after a particular value has changed transferred by the process the 51 in an outgoing telegram 59 to the transmitter 53 for transmission. The information transferred on integration of the field device into the communication network from the commissioning facility to the receiver 54 of the field device is for example stored in information store 52. After the eighteenth operation 109 the receiver 50 will for example be switched off by the processor 51 of via a control signal 61, which significantly reduces the energy consumption of the field device. In a variant of the advantageous field device, after the sending out of an outgoing telegram 59 in each case the receiver 54 is switched on via the control signal 61 for the duration of a relatively short time window. The duration of the time window is dimensioned and oriented to the standard used so that the receiver 54 could receive an incoming telegram 60 in the time window. The field device is also addressable precisely in this time window if required via the receiver 54.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for integrating wirelessly-communicating network nodes of a process environment into a data communication network by a commissioning facility, comprising:
   at least one processor communicatively coupled with the commissioning facility that performs an operation of integrating the network nodes including:
      generating a visualization of at least a part of the process environment on an output unit of the commissioning facility as a visualized process environment;
      detecting a current spatial position of the commissioning facility;
      showing the commissioning facility in accordance with the current position thereof in the visualized process environment;
      detecting an identification signal of a network node belonging to the process environment;
      determining a relative spatial position for the network node in relation to the current spatial position of the commissioning device;
      generating a proposal for assignment of the identification signal detected, for a node model stored in a database, based on the relative spatial position determined, in relation to the current spatial position of the commissioning device;
      showing the node model proposed for assignment in the visualized process environment;
      assigning the network node to the proposed node model by storing address information present in the identification signal of the network node in a variable of the node model proposed for assignment; and
      showing, after said assigning, a representation of the network node in the visualized process environment.

2. The method as claimed in claim 1, wherein said generating of the proposal includes evaluating at least one of assignment levels and delay times of radio signals.

3. The method as claimed in claim 2, wherein the triangulation method is used to generate the proposal for the assignment.

4. The method as claimed in claim 3, wherein an uncertainty of a determined position of an identified network node is visually displayed on the output unit of the commissioning facility.

5. The method as claimed in claim 4, wherein with the integration of a network node exercising a sensor function a radio receiver of the network node is switched off automatically.

6. A commissioning facility for integrating wirelessly-communicating network nodes into a data communication network, comprising:
   a graphical user interface, including an output unit;
   a device for wireless communication; and
   means, including a GPS module,
      for accessing a model of a process environment,
      for generating a visualization of at least a part of the process environment on the output unit as a visualized process environment,
      for detecting a current position of said commissioning facility using the GPS module,
      for displaying on the output unit the current position of said commissioning facility in the visualized process environment;
      for detecting an identification signal of a network node belonging to the process environment;
      for determining a relative spatial position of the network node in relation to the current position of said commissioning facility;
      for generating a proposal for assignment of the identification signal detected, for a node model stored in a database, based on the relative spatial position determined in relation to the current position of said commissioning facility;
      for displaying the node model proposed for assignment in the visualized process environment;
      for assigning the network node to the proposed node model by storing address information present in the identification signal of the network node in a variable of the node model proposed for assignment, for displaying, after assignment of the network node, a representation of the network node in the visualized process environment, and wherein the network node is able to be integrated with the data communication network, having a process environment, by the commissioning facility including a sensor, a radio receiver and a transmitter, wherein a control signal is generated by integration of the network node into the data communication network, causing the radio receiver to be switched off.

7. The network node as claimed in claim 6, wherein the control signal is generated in each case when a message is sent out via the transmitter, such that the receiver is switched off for a predetermined time window after the message has been sent out.

* * * * *